Patent 3,133,783 — Recording System

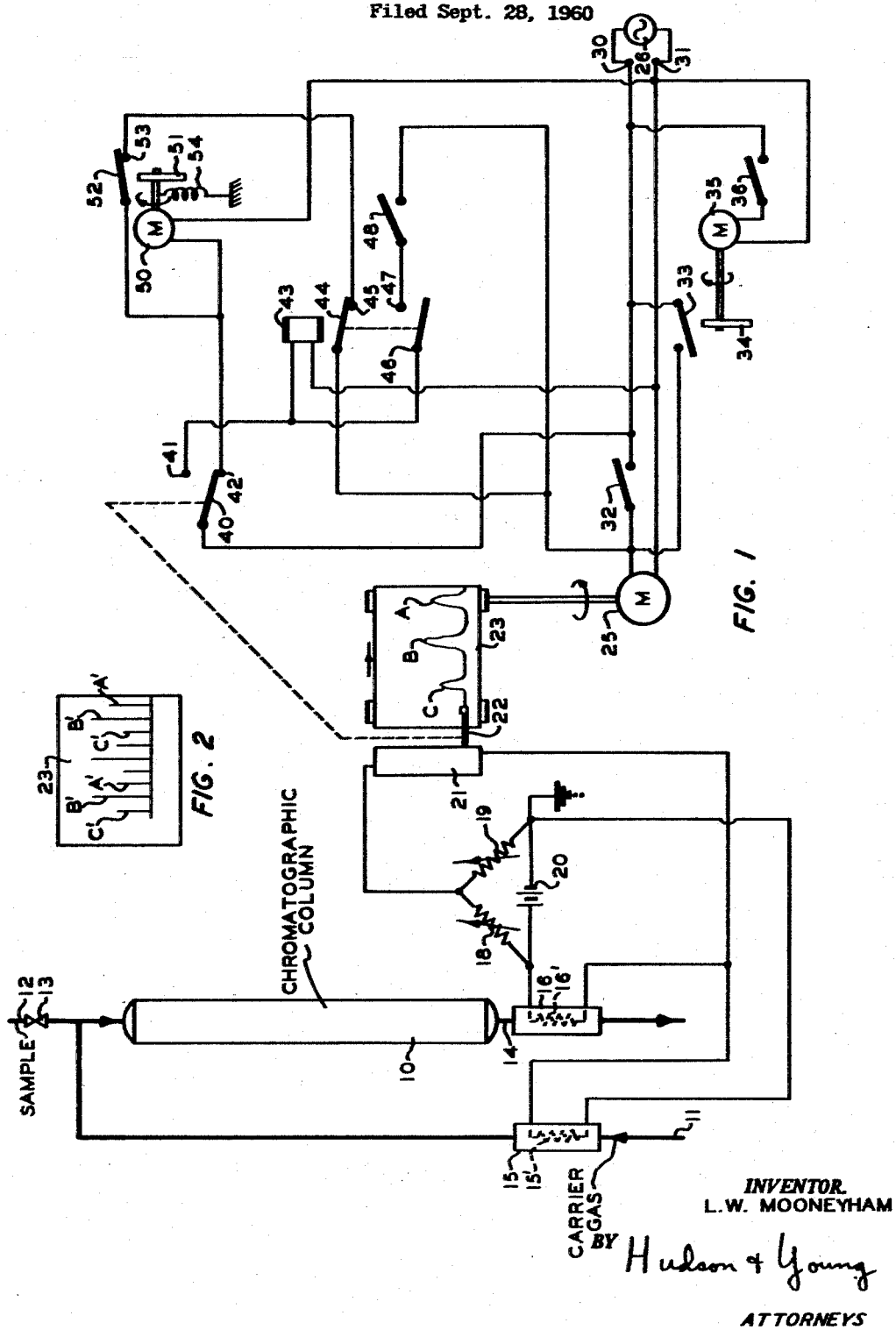

3,133,783
RECORDING SYSTEM
Leonard W. Mooneyham, Bartlesville, Okla., assignor to Phillips Petroleum Company, a corporation of Delaware
Filed Sept. 28, 1960, Ser. No. 59,092
8 Claims. (Cl. 346—34)

This invention relates to the recording of a plurality of signals which are received in sequence.

Various types of analytical instruments are known which provide a plurality of output signals in sequence. One example of such an instrument is a chromatographic analyzer. The individual constitutents of a fluid mixture being analyzed appear in the column effluent in sequence. The detector associated with the analyzer thus provides a plurality of output signals in sequence. Another example of such an analytical instrument is a mass spectrometer. By changing the accelerating potentials or the strength of a deflecting magnetic field, ions of preselected masses are focused on the detector in sequence. A mass spectrometer thus provides a plurality of output signals in sequence.

It is common practice to record signals from instruments of these types on motor driven charts. The chart normally is driven continuously and the recording pen is deflected in response to the signals to be recorded. However, this type of recording procedure has a serious drawback when the individual signals to be recorded are spaced from one another by substantial time intervals. It is obvious that a large amount of the recording medium is wasted between the individual signals, and the interpretation of the records is difficult if corresponding signals from the different analyses are spaced substantial distances from one another on the chart.

In accordance with the present invention there is provided an improved signal recording system wherein individual signals appear adjacent one another on the recording medium. In a first embodiment of this invention, the recording medium is driven for a short time interval after each individual signal is received. Thereafter, the recording medium remains stationary until the next signal arrives. This conserves the recording medium and results in individual signals being positioned adjacent one another on the recording medium. In accordance with another embodiment of this invention, the recording medium remains stationary during the time the individual signals are received so that a straight line is marked. The recording medium is then moved short distances after the signals are recorded so that individual signals are spaced from one another.

Accordingly, it is an object of this invention to provide an improved recording system wherein a plurality of signals are displayed adjacent one another on a recording medium.

Another object is to provide an improved bar graph recorder.

Other objects, advantages and features of the invention should become apparent from the following detailed description, taken in conjunction with the accompanying drawing in which:

FIGURE 1 is a schematic representation of the signal recording system of this invention.

FIGURE 2 is a graphical representation of a typical recording which can be produced by the apparatus of FIGURE 1.

The recording system of this invention will be described in conjunction with a chromatographic analyzer, although it is to be understood that the system can be employed to record any type of signals which are received in sequence.

Referring now to the drawing in detail and to FIGURE 1 in particular, there is shown a chromatographic column 10 which is filled with a material that selectively retards passage therethrough of the individual constituents of a fluid sample to be analyzed. A carrier gas is introduced into the first end of column 10 through a conduit 11. A fluid sample to be analyzed is introduced into the first end of column 10 through a conduit 12 which has a control valve 13 therein. Valve 13 is opened for a short interval of time to permit the introduction of a preselected volume of the fluid sample to be analyzed. Various types of automatic sample valves for use in this manner are well known. The effluent from column 10 is removed through a conduit 14. As is well known, a chromatographic analyzer separates the individual constituents of the fluid mixture being analyzed so that these constituents appear in sequence in the column effluent.

In order to detect the individual constituents of the fluid sample as they appear in the column effluent, a detector cell 16 is disposed in conduit 14. A reference cell 15 is disposed in conduit 11 so that differences in composition of the fluid flowing through the two conduits can be detected. Cells 15 and 16 preferably contain temperature sensitive resistance elements 15′ and 16′, respectively. These resistance elements are connected in a bridge network which compares the resistances of the two elements, and thus the thermal conductivities of the fluids flowing through conduits 11 14. Resistance elements 15′ and 16′ are connected in series with one another to form two adjacent arms of the bridge network. Variable resistors 18 and 19 form the remaining arms. A current source 20 is connected across two opposite terminals of the bridge, and the opposite output terminals are connected to the pen displacement mechanism 21 of a recorder. This pen displacement mechanism moves a pen 22 on a recording chart 23 in response to the output signal of the bridge network. Chart 23 is driven by a motor 25.

The first terminal of chart drive motor 25 is connected to a power terminal 31, and the second terminal of motor 25 is connected to a power terminal 30 through a switch 32. A current source 26 is connected to power terminals 30 and 31 to energize motor 25. If switch 32 is closed, motor 25 drives chart 23 continuously. In normal operation of this invention, switch 32 remains open. However, it can be closed whenever it is desired to advance chart 23.

A switch 33 is connected in parallel with switch 32. Switch 33 is adapted to be closed by a cam 34 which is connected to the drive shaft of a motor 35. Motor 35 is connected to power terminals 30 and 31 through a switch 36. If it is desired to produce a conventional recording of the output of the chromatographic column, switch 36 is closed to energize motor 35. Cam 34 is designed so as to close switch 33 during one complete cycle of analysis. Motor 25 thus drives char 23 during the complete analysis cycle, and the output signal from the bridge network is recorded continuously.

In many operations, the individual peaks A, B and C on the chart are spaced from one another by susbtantial time intervals so that a considerable amount of the chart is wasted. This difficulty can be overcome by the apparatus illustrated in FIGURE 1. Power terminal 30 is connected to a switch 40 which is adapted to engage terminals 41 and 42 selectively. Switch 40 is connected mechanically to pen 22 so that switch 40 engages terminal 42 when the pen is at the zero reference point on the recording chart. Whenever a peak arrives, pen 22 is displaced upwardly so that switch 40 engages terminal 41 as long as the pen is displaced from the zero point. Terminal 41 is connected to the first terminal of a relay coil 43. The second terminal of relay coil 43 is connected to power terminal 31. Terminal 41 is also connected to a switch 46 which engages a terminal 47 when relay coil 43 is energized. Terminal 47 is connected through a manually operated switch 48 to the second terminal of motor 25. Terminal 42 is connected to the first terminal of a timing motor 50, the second terminal of which is connected to power terminal 31. The second terminal of motor 25 is connected to a switch 44 which engages a terminal 45 when relay coil 43 is deenergized. Terminal 45 is connected to a terminal 53 which is adapted to be engaged by a switch 52. Switch 52 is connected to terminal 42. A cam 51 is carried by the drive shaft of motor 50 so as to open switch 52 when motor 50 is energized. Motor 50 is a stall-type motor, and cam 51 is designed so that the motor is stalled immediately after switch 52 is moved to an open position. A spring 54 is connected to the drive shaft of motor 50 so as to rotate the shaft back to the initial position when current is no longer supplied to motor 50.

When it is desired to position the individual peaks A, B and C on chart 23 adjacent one another, switch 48 is closed. Switches 32 and 36 remain open at this time. When the first signal from the bridge network is received by pen displacing mechanism 21, pen 22 moves upwardly on the chart to record the first peak. This moves switch 40 into engagement with contact 41 to energize relay coil 43. Switch 46 is closed by the relay so that chart drive motor 25 is energized. This drives the chart as the first peak is recorded. Immediately thereafter, switch 40 moves downwardly to engage terminal 42 so the relay 43 is deenergized and motor 50 is energized. Switch 52 is closed at this time. Since terminal 42 is thus connected with terminal 45 the second terminal of motor 25 is connected to power terminal 30 through switches 44, 52 and 40. Motor 25 thus continues to rotates to advance chart 23. This operation continues for a short interval of time, such as ten seconds. At the end of the ten second period, cam 51 opens switch 52 so that motor 25 is no longer energized. The recorder chart thus remains stationary until the next peak is received by the pen displacement mechanism. As soon as switch 40 moves upwardly to engage contact 41 to start the next signal, spring 54 returns the drive shaft of motor 50 to the initial position because the motor is no longer energized.

The interval between adjacent peaks A, B and C on chart 23 can be any preselected time as determined by the configuration of cam 51.

In some operations, it is desirable to display the output signals of the analyzer in the form of a bar graph of the type shown in FIGURE 2. This is accomplished by keeping chart 23 stationary during the times the individual signal are received. The chart is then moved short distances between adjacent signals. This operation is accomplished by the apparatus previously described except that switch 48 is opened. Therefore, motor 25 does not drive chart 23 when a signal is received because of the open switch 48. However, the chart does travel between the signals in the manner described with reference to motor 50.

As previously mentioned, the recording system of this invention can be utilized to record any type of signals which are received in sequence. By selected operation of switches 32, 36 and 48 it is possible to produce various types of records. The chart can be driven conitnuously or during preselected time intervals. Furthermore, the chart can be driven only between the signals or during the times the signals are received and for short intervals thereafter. This provides as versatile signal recorder.

While the invention has been described in conjunction with a present preferred embodiment, it should be evident that it is not limited thereto.

What is claimed is:

1. Apparatus for recording a plurality of signals in sequence comprising a recording medium, first electric motor means to displace said recording medium in a first direction, marking means positioned in contact with said recording medium, second means to displace said marking means on said recording medium in response to the signals to be recorded, a source of electrical energy to energize said first means and means responsive to movement of said marking means to a predetermined position on said recording medium to connect said first means to said source of energy for a predetermined time interval.

2. Apparatus for recording a plurality of signals in sequence comprising a recording medium, first means to displace said recording medium in a first direction, marking means positioned in contact with said recording medium, second means to displace said marking means on said recording medium in response to the signals to be recorded, a source of energy to energize said first means, means responsive to movement of said marking means away from a reference point on said recording medium to connect said first means to said source of energy, and another means responsive to movement of said marking means back to said reference point to connect said first means to said source of energy for a predetermined time interval.

3. Apparatus for recording a plurality of signals in sequence comprising a recorder chart, an electric motor connected to said chart to move said chart, a marking pen positioned in contact with said chart, means to displace said pen on said chart in response to signals to be recorded, a source of electrical energy to energize said motor, and means responsive to movement of said pen to a predetermined position on said chart to connect said motor to said source of energy for a predetermined time interval.

4. The apparatus of claim 3 wherein said means to connect comprises circuit means having a switch therein to connect said motor to said source, a timing motor, means responsive to movement of said pen to said predetermined position to energize said timing motor, and means responsive to said timing motor to open said switch a predetermined time after said timing motor is energized.

5. Apparatus for recording a plurality of signals in sequence comprising a recorder chart, a motor connected to said chart to move said chart, a marking pen positioned in contact with said chart, means to displace said pen on said chart in response to signals to be recorded, a source of energy to energize said motor, means responsive to movement of said pen away from a reference point on said chart to connect said motor to said source of energy, and another means responsive to movement of said pen back to said reference point to connect said motor to said source of energy for a predetermined time interval.

6. Apparatus for recording a plurality of signals in sequence comprising a recorder chart, a first electric motor connected to said chart to move said chart, a marking pen positioned in contact with said chart, means to displace said pen on said chart in response to signals to be recorded, a source of electrical energy to energize said first motor, a first switch connected to said pen and adapted to be moved to a first position by movement of said pen beyond a reference point and to a second position when said pen returns to said reference point, first circuit means responsive to said first switch being in a first position to connect said first motor to said source, a timing motor, second circuit means having a second switch therein to connect said first motor to said source responsive to said first switch being in a second position, circuit means responsive to said first switch being in said second position to energize said timing motor, and means responsive to said timing motor to open said second switch a predetermined time after said timing motor is energized.

7. The apparatus of claim 6 wherein said timing motor is a stall motor, and said means to open said second switch comprises a cam connected to the drive shaft of said timing motor to open said second switch when said timing motor rotates a predetermined amount and thereafter to stop said timing motor, and spring means connected to the drive shaft of said timing motor to return said cam to its original position when said timing motor is not connected to said source of electrical energy.

8. The apparatus of claim 6, further comprising a third switch in said first circuit means whereby said first switch being in said first position connects said first motor to said source only when said third switch is in a closed position.

References Cited in the file of this patent

UNITED STATES PATENTS

| | | |
|---|---|---|
| 426,144 | Schroyer | Apr. 22, 1890 |
| 1,964,409 | Whittaker | June 26, 1934 |
| 2,517,316 | Holmes | Aug. 1, 1950 |
| 2,746,834 | McLean | May 2, 1956 |
| 2,904,384 | Norem | Sept. 15, 1959 |